United States Patent [19]

van der Meer

[11] Patent Number: 4,588,275
[45] Date of Patent: May 13, 1986

[54] PHOTOGRAPHIC APPARATUS

[75] Inventor: Jan van der Meer, Enschede, Netherlands

[73] Assignee: Polaroid Corporation, Cambridge, Mass.

[21] Appl. No.: 728,928

[22] Filed: Apr. 30, 1985

[51] Int. Cl.⁴ ............................................. G03B 19/12
[52] U.S. Cl. .................................... 354/150; 354/154; 354/156
[58] Field of Search ............... 354/150, 152, 154, 155, 354/156, 200, 201, 219, 224, 225

[56] References Cited

U.S. PATENT DOCUMENTS

| | | | |
|---|---|---|---|
| 2,016,058 | 10/1935 | Steiner | 354/152 |
| 2,348,510 | 5/1944 | Aiken | 354/152 |
| 2,408,811 | 10/1946 | Resk | 354/150 |
| 2,647,449 | 8/1953 | Wolf | 354/150 |

Primary Examiner—A. A. Mathews
Attorney, Agent, or Firm—Karl Hormann

[57] ABSTRACT

A photographic camera of the single lens reflex type having a reflex member pivotable between an exposure position and a viewing position there being provided as a part cooperating with the reflex member, a dark slide for covering an exposure plane before the reflex member is in its exposure position.

9 Claims, 4 Drawing Figures

PHOTOGRAPHIC APPARATUS

BACKGROUND OF THE INVENTION

1. Field of the Invention

The present invention relates to photographic apparatus in general and to reflex cameras in particular.

2. Description of the Prior Art

Reflex cameras, particularly of the 35 mm type, are, of course, well known owing to their popularity among photographers, professional and amateur alike. Their popularity is based to some extent on the fact that they permit the use of interchangeable lenses of different parameters without requiring viewfinders specific to each lens or provided with frames delineating the field of view of a particular lens. Such cameras make use of a reflector intercepting the optical path of the objective lens for reflecting a true image of the scene to be photographed into the viewfinder. For subsequent exposure of film, the reflector is moved out of the optical path.

In some instances, reflex cameras may use a reflector for directing the image not only into the viewfinder but also to the film for exposure purposes.

The present invention relates to this latter type of reflex camera and will be described, by way of example, as incorporated in a copy camera. Those skilled in the art will appreciate, however, that the inventive concept may be applied to photographic cameras generally.

Copy cameras as exemplified by the multi-purpose industrial view camera marketed by Polaroid Corporation of Cambridge, Mass., under its registered trademark MP-4, comprise a normally open shutter, an objective lens, and a viewing and focusing screen for rendering an object to be photographed visible to an operator. Visibility of the object is enhanced by a hood covering the screen and an eyeshade as well as a reflex member within the hood for deflecting an image of the object towards the eyeshade. Having framed and focused the image, an operator may proceed to taking a photograph thereof. This may be done in one of two possible ways: the operator may insert a film unit under the viewing screen. The film unit, for this purpose, is first inserted into a holder and is provided with a dark slide. Insertion of the film holder into the camera results in automatic closure of the shutter. Once the holder is properly positioned within the camera, the operator removes the dark slide from the film and exposes the film by actuating the previously set shutter. Thereafter, the film unit is again covered by the dark slide and processed in a well-known manner.

The other way of exposing a film unit with the copy camera referred to is laterally to move the screen out of the path of the optical axis and to move a magazine of film units into the position until then occupied by the viewing and focusing screen, after framing and focusing the scene or object has been completed. This movement leads to closing of the shutter to prevent the film unit located in the magazine for exposure from being exposed accidentally. Once the film unit is in its exposure position, a dark slide is removed from it, and the shutter is then actuated for exposure. Thereafter, the film unit is removed from the magazine and processed in a well-known manner. Before returning the magazine to its original position, the film units remaining therein have again to be covered by the dark slide lest they be spoiled by light.

It will be apparent to those skilled in the art that the sequential uncovering and covering of film units by a dark slide requires relatively complex manipulations and may, if not properly attended to, lead to spoiling of film within the magazine.

SUMMARY OF THE INVENTION

It is, therefore, an object of the instant invention to provide for an improved copying camera.

A further object of the invention is to provide a camera of the kind under consideration which provides for an improved dark slide arrangement.

Yet another object of the invention resides in the provision of a camera provided with a dark slide, the position of which may be automatically changed in accordance with the operation of a reflex mechanism of the camera.

Another object of the invention is to provide a camera equipped with a dark slide which, when the camera is in a viewing mode, covers film units stored within the camera and, when the camera is in an exposure mode, uncovers the film units.

It is also an object of the invention to provide for a camera having a dark slide which when the reflex member of the camera is in its position for deflecting an image of a photographic object to a viewing and focusing screen, protects a film unit from actinic radiation and which as a consequence of the reflex member moving to its position for exposing the film unit by deflecting the image of the object to an exposure plane may automatically be moved to uncover the film unit.

BRIEF DESCRIPTION OF THE DRAWINGS

A preferred embodiment of the invention are described in the following specification with reference to the accompanying drawings in which.

DETAILED DESCRIPTION OF THE INVENTION

A camera in accordance with the invention includes a frame within which a film unit may be mounted in an exposure plane, a viewing screen and an exposure mechanism, as well as a reflex member movable between a first position in which it renders an object viewable in a viewing screen and another position in which it deflects an image of the object toward the exposure plane, there being provided for movement timed to relate to the movement of the reflex member a cover member or dark slide for light shielding the exposure plane at least when the reflex member is in its first position.

Figure 1:
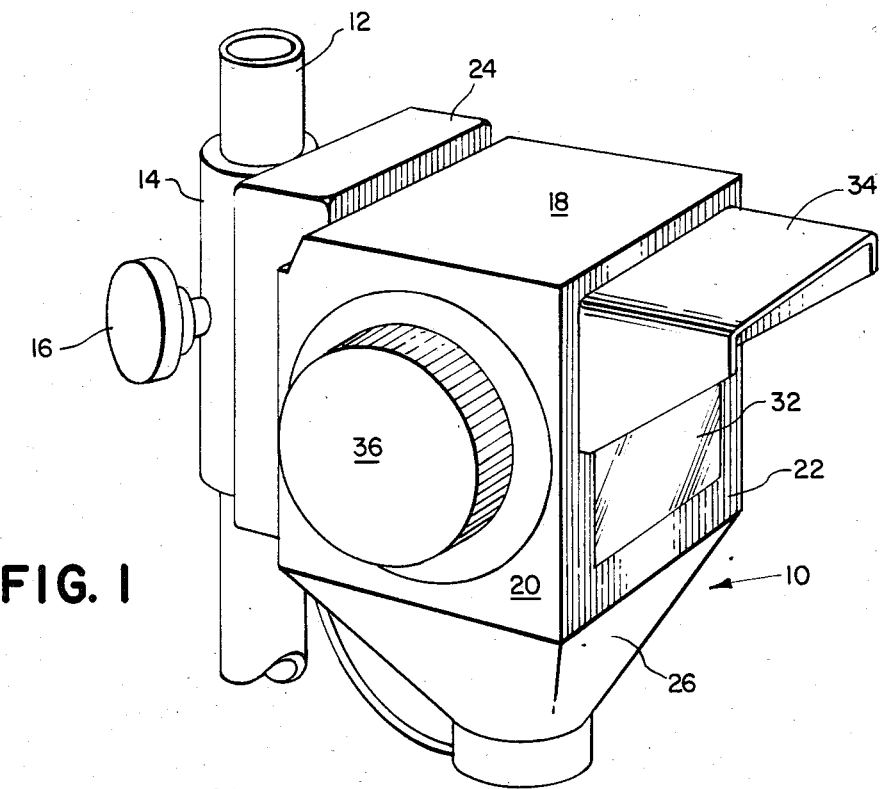
FIG. 1 is a view, in perspective, of a camera in accordance with the invention.

Reference may now be had to FIG. 1 in which there is shown an embodiment of a camera 10 in accordance with the invention, mounted for vertical and pivotal movement on an upright column 12 by means of a bracket 14. A set screw 16 is provided in the bracket 14 for securing the camera 10 against movement relative to the column 12. The camera 10 is seen to comprise a box-like frame structure having a plurality of wall members 18, 20, 22, as well as a further wall positioned opposite wall 22 but not viewable. Opposite wall member 22, positioned between, and attached to both, the camera 10 and the bracket 14, is a camera back 24 providing an exposure plane 24a. The camera back 24 also supports a film cassette (not shown) containing a plurality of planar film units (not shown) in stacked relationship. The film units may be of the kind which may be processed in situ immediately after exposure by well-known means, such as pressure rollers (not shown). A substantially pyramidal structure 26 opposite the wall member 18 completes the housing of the camera 10, and supports at its apex an exposure mechanism including an objective lens 28 and a shutter (not shown) which may be actuated by a cable release 30.

The wall member 22 serves, in part, as a frame or support for a viewing screen 32 positioned parallel to the exposure plane. The screen 32 may be a conventional ground glass plate, and an eyeshade 34 may be provided for enhancing the visibility of an image on the screen 32. On the exterior of the wall member 20 there is seated a knurled knob 36 which is connected to a shaft 38 by way of a lost motion connection. The shaft 38 is journaled for rotation in suitable bearings (not shown) in the wall member 20 and the wall opposite it. The shaft 38 extends parallel to and substantially midway between the viewing screen 32 and the exposure plane 24a. Preferably, rotatability of the shaft 38 by the knob 36 is restricted to two steps of substantially 90° each, for reasons set forth hereinafter. Incremental steps of rotation of about 90° each are suggested as they simplify the structure and operation of the camera; other angles may be chosen to suit particular purposes and dimensions. The knob 36 may be replaced by a power drive, such as an electric motor, the actuation of which may be coordinated with the actuation of the shutter mechanism in a well-known manner.

Fixedly mounted to a flattened medial portion of the shaft 38 is a flat rectangular plate 40. As shown in the drawings, the plate 40 is affixed to the shaft 38 in such a way that the center line of the plate 40 extending parallel to its margins 42 and 44 is slightly offset from the axis of the shaft 38 for reasons explained below. The upper margin 42 (FIG. 2) of the plate 40 is placed further away from the axis of the shaft 38 than is the lower margin 44. The margins 42 and 44 move along surfaces of two imaginary cylinders positioned in parallel relationship. These surfaces coincide with the surfaces 50 and 52 of a cylindrically curved plate 46. The surface of the cylinder having the larger diameter coincides, moreover, with surface portions 48a, 48b, and 48c of internal housing sections.

The plate 40 is substantially rectangular, and its opposite end margins which extend normal to the margins 42 and 44 may be coated with an appropriate light absorbing material. Preferably, they are positioned in slidable contact with the interior surfaces of the wall 20 and its opposite wall, for purposes of establishing a light seal.

One surface 54 of the plate 40 is polished or coated to be highly reflective for purposes described below. The lower margin 44 of the plate 40 is positioned to be in slideable contact with the surface 52 of the plate 46. The plate 46 has substantially the same longitudinal dimension as the plate 40 and is curved about an axis coinciding with the axis of the shaft 38. The plate 46 is preferably made of, or coated with, a light absorbing material. Its outer surface 50 has a radius of curvature substantially identical to that of the surface portions 48a, 48b, and 48c, there being provided very close tolerances between the surface 50 and the surface portions 48a, 48b, and 48c to provide an effective light seal.

As stated above, planar film units may be positioned in the camera back 24. The camera back 24 is removably mounted on the camera 10 at suitable abutments 56 and 58 to permit loading with film in a well-known manner. Light sealing (not shown) is provided between the camera 10 and the back 24 to prevent unwanted exposure of film.

Figure 2:
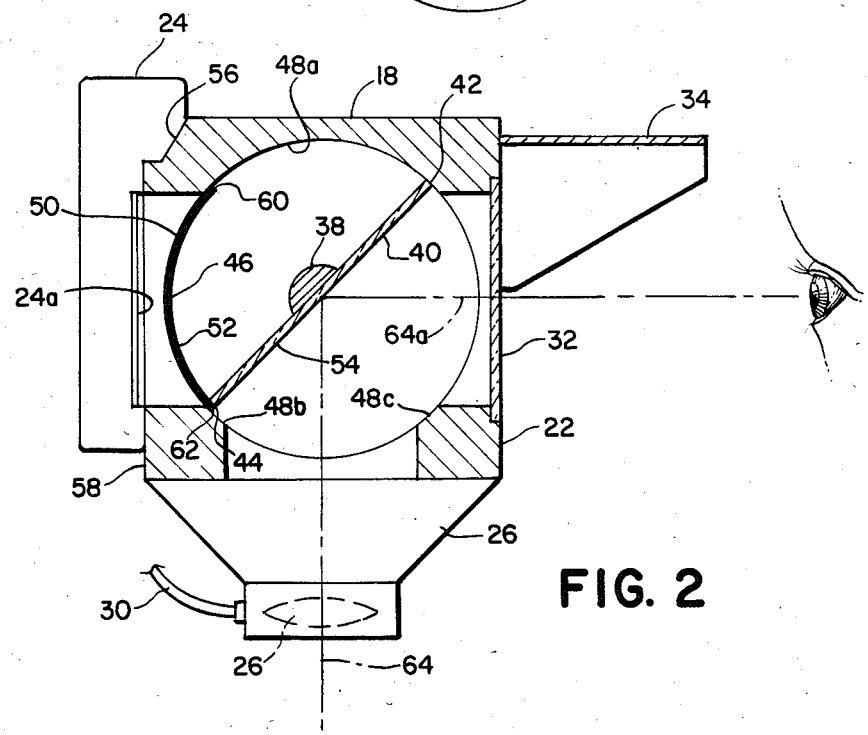
FIG. 2 is a view, in longitudinal section, of the camera shown in FIG. 1, in condition for viewing and focusing an object.

An opening at least as large as the photosensitive area of a film unit is provided between the abutments 56 and 58. As shown in FIG. 2, the plate 46, hereinafter called dark slide, is in a position in which it covers the aperture, opposite marginal portions 60 and 62 engaging marginal portions of the cylindrical sections 48a and 48b, respectively, in tight slideable contact to provide a light seal. At this time the plate 40 which constitutes a reflex member is positioned such that its reflective surface 54 intersects the optical axis 64 of the objective lens 28 at an angle of 45°. The optical axis 64 extends normal to, and intersects, the axis of the shaft 38. Therefore, the optical axis 64 is deflected (64a) such that light rays from the objective lens 28 impinge upon the viewing screen 32 and render any object positioned within the field of view of the lens 28 viewable on the screen 32.

Figure 4:
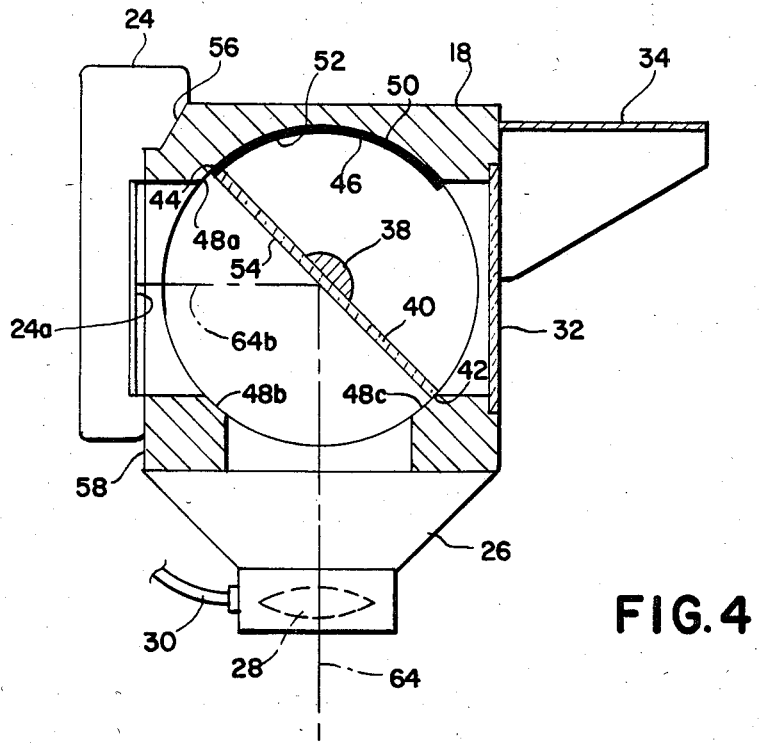
FIG. 4 is a view similar to FIG. 2 with the camera in condition for exposure.

FIG. 4 depicts the camera 10 in its exposure mode. Here, the reflex member 40 has been pivoted by 90° into a position in which its reflective surface 54 intersects the optical axis of the lens 28 at an angle of 135°. Accordingly, the optical axis is deflected (64b) toward, and light rays emanating from the lens 28 impinge upon, the exposure plane 24a, i.e., the film within the camera back 24. Pivoting the plate 40 to this position entails movement of the dark slide 46 into a position in which it uncovers the opening in the camera back 24 and is superimposed upon the cylindrical surface 48a. The film may thus be exposed by actuation of the shutter (not shown) by way of the cable release 30.

Figure 3:
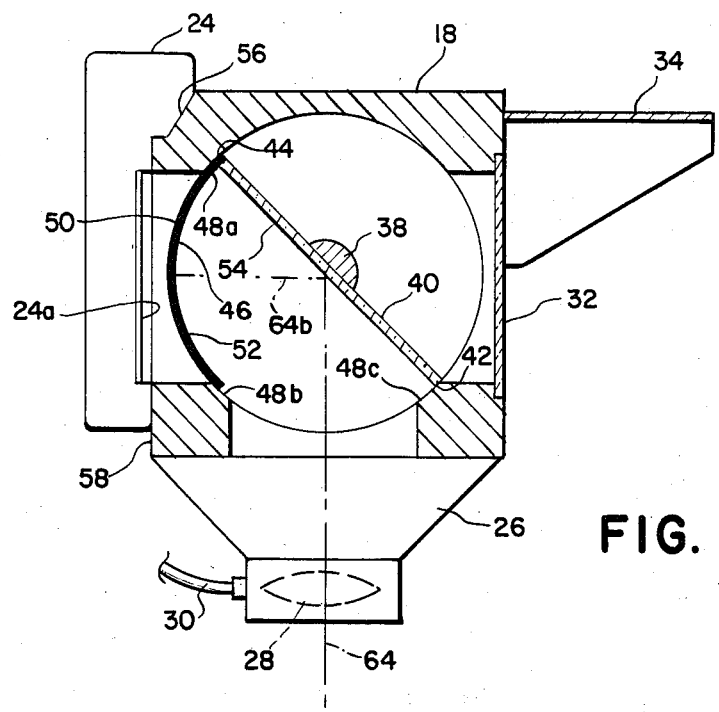
FIG. 3 is a view, in longitudinal section, of the camera in a condition between its viewing and exposure conditions.

As stated above, the knob 36 or power drive, as the case may be, is connected to the shaft 38 by a lost motion connection. By another lost motion connection the knob 36 is also connected to the dark slide 46. As lost motion connections are well known in the art, the ones used in the camera 10 have neither been shown nor will their structure be described, as it is believed that a description of their function in connection with the apparatus of this invention suffices to enable a person skilled in the art to select appropriate mechanisms. The knob 36 has been described as being preferably rotatable by two consecutive increments of substantially 90° each. Rotatability of the knob 36 is thus limited to a total of about 180°. These increments may be continuous or they may be marked by a signal noticeable to the person using the camera by way of indicating the transition from the first to the second step and, hence, the operative condition of the camera. The lost motion connections are such that during an initial 90° rotation of the knob 36 the plate 40 is pivoted from its viewing position shown in FIG. 2 to its exposure position shown in FIGS. 3 and 4. The dark slide 46 does not move at this time; instead the margin 44 of the plate 40 moves across the surface 52 of the dark slide 46. During the second 90° increment of rotation of the knob 36, the plate 40 remains in its exposure position shown in FIGS. 3 and 4, and the dark slide 46 is moved from its film covering position of FIGS. 2 and 3 to the position shown in FIG. 4.

Before movement of the reflex member 40, but in any event before movement of the dark slide 46 the shutter (not shown) will have been closed, preferably by a well-known connection between it and the knob 36. When the shutter is closed, no light may penetrate to the film within the camera back 24a as any light entering into the camera housing through the viewing screen 32 is prevented from reaching the film by the reflex member 40 as well as by the dark slide 46. During pivoting of the reflex member 40 into its exposure position of FIGS. 3 and 4, film in the camera back 24 is shielded from light by the dark slide 46 only. Once the reflex member 40 has arrived in its position of FIGS. 3 and 4, it again shields the film from light entering through the screen 32, and the dark slide 46 may be moved to its position of FIG. 4. An exposure may now be taken by actuating the shutter. The reflex member 40 then deflects light from the photographic object to the film.

After closing the shutter after termination of the exposure, the dark slide 46 is returned to the position in which it covers the film within the camera back 24, before the reflex member 40 is moved to its initial viewing and focusing position. The dark slide 46 and the reflex member 40 may be sequentially returned to their initial positions an automatic spring drive wound during their movement to their exposure position and released by the closure of the shutter after the exposure has taken place.

It is believed that the advantages of the apparatus described are obvious. The embodiment has been described merely as an illustrative example of the applicability of the invention and is not intended to limit the scope of protection sought. Modifications which do not depart from the scope of protection sought for the inventive concept will be obvious to persons skilled in the art. One such modification may, for instance, result in centrally suspending the reflex member on its axis of rotation and commensurately to displace the dark slide. The scope of protection is to be interpreted solely on the basis of the appended claims.

What is claimed is:

1. A camera comprising:
a frame assembly;
means connected to said frame assembly for mounting film at an exposure plane;
a viewing screen connected to said frame assembly;
an objective lens connected to said frame assembly;
a mirror pivotally mounted in said frame assembly for selective movement between a first position wherein image-forming light rays entering said camera through said objective lens are redirected by said mirror toward said screen and a second position wherein such light rays are redirected by said mirror toward said exposure plane; and
a dark slide mounted for movement timed to relate to the movement of the mirror between its first and second positions, and configured and arranged to provide a light seal between said exposure plane and the interior of said camera before said mirror is in its said second position and to permit such light rays to reach said exposure plane when said mirror is in its said second position.

2. The camera of claim 1 wherein said exposure plane, said viewing screen and the optical axis of said objective lens are disposed in parallel alignment and including means for moving said mirror and said dark slide about an axis extending parallel to said exposure plane and said viewing screen and normal to said optical axis.

3. The apparatus of claim 2, wherein said dark slide comprises a cylindrically curved plate radially displaced from said axis of said moving means and positioned concentrically with respect thereto.

4. The camera of claim 3, wherein said moving means comprises a rotatable member connected to said mirror by a first lost motion connection.

5. The camera of claim 4, wherein said rotatable member is connected to said dark slide by a second lost motion connection.

6. The apparatus of claim 1, further including a shutter mechanism operatively connected with said mirror, whereby the shutter is in an open position when said mirror is in its said first position.

7. The camera of claim 6, further providing means for cocking and closing the shutter when said mirror is moved toward its said second position.

8. A photographic apparatus, comprising:
a housing comprising a plurality of wall members, a first one of said wall members comprising means for mounting a photosensitive element;
viewing means mounted in a second wall member for viewing a photographic object;
exposure means mounted in a third wall member and providing an optical axis extending substantially parallel to said exposure plane;
reflective means mounted for pivotal movement about an axis extending normal to said optical axis and parallel to said exposure plane, between a first position in which it deflects said optical axis towards said exposure plane and a second position in which it deflects said optical axis towards said viewing means; and
means mounted for sequential movement with said reflective means for covering said exposure plane before said reflective means is in its said first position.

9. A photographic apparatus, comprising:
a housing comprising a plurality of substantially orthogonally arranged and interconnected wall members for forming a substantially light-impervious enclosure, a first one of said wall members comprising means for mounting a photosensitive element in a plane for exposure;
viewing means mounted in a second wall member opposite said first wall member for viewing a photographic object;
exposure means, including objective lens means, mounted in another wall member and providing an optical axis extending substantially parallel to said exposure plane;
means comprising reflective means mounted for pivotal movement about an axis extending normal to said optical axis and parallel to said exposure plane, between a first position in which it deflects said optical axis towards said exposure plane and a second position in which it deflects said optical axis towards said viewing means; and
means mounted for sequential movement with said pivotal means for covering said exposure plane before said reflective means is into said first position.

* * * * *